(12) United States Patent
Hirahara

(10) Patent No.: US 8,561,128 B2
(45) Date of Patent: Oct. 15, 2013

(54) DOCUMENT MANAGEMENT SYSTEM AND DOCUMENT MANAGEMENT METHOD

(75) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1098 days.

(21) Appl. No.: 11/866,311

(22) Filed: Oct. 2, 2007

(65) Prior Publication Data

US 2008/0098455 A1 Apr. 24, 2008

(30) Foreign Application Priority Data

Oct. 20, 2006 (JP) .................................. 2006-286886

(51) Int. Cl.
*H04L 29/06* (2006.01)

(52) U.S. Cl.
USPC .................................. 726/1; 726/28; 713/193

(58) Field of Classification Search
USPC ......................................... 726/1, 28; 713/193
See application file for complete search history.

(56) References Cited

U.S. PATENT DOCUMENTS

| | | | | |
|---|---|---|---|---|
| 6,408,326 | B1 * | 6/2002 | Larsson et al. | 709/201 |
| 6,499,110 | B1 * | 12/2002 | Moses et al. | 726/1 |
| 7,555,769 | B1 * | 6/2009 | Shapiro et al. | 726/1 |
| 7,613,678 | B2 * | 11/2009 | Koguchi | 1/1 |
| 2002/0055921 | A1 | 5/2002 | Yoshimura et al. | |
| 2003/0065942 | A1 * | 4/2003 | Lineman et al. | 713/201 |
| 2004/0111643 | A1 * | 6/2004 | Farmer | 713/201 |
| 2004/0128555 | A1 * | 7/2004 | Saitoh et al. | 713/201 |
| 2004/0172634 | A1 * | 9/2004 | Honda et al. | 718/104 |
| 2004/0181690 | A1 * | 9/2004 | Rothermel et al. | 713/201 |
| 2005/0021980 | A1 * | 1/2005 | Kanai | 713/182 |
| 2005/0022027 | A1 * | 1/2005 | Bonn et al. | 713/201 |
| 2005/0053063 | A1 * | 3/2005 | Madhavan | 370/389 |
| 2005/0086252 | A1 * | 4/2005 | Jones et al. | 707/102 |
| 2005/0131712 | A1 * | 6/2005 | Kaminsky et al. | 705/1 |
| 2005/0198283 | A1 * | 9/2005 | Ramamoorthy et al. | 709/225 |
| 2005/0257244 | A1 * | 11/2005 | Joly et al. | 726/1 |
| 2006/0077420 | A1 * | 4/2006 | Okamoto et al. | 358/1.14 |
| 2006/0080352 | A1 * | 4/2006 | Boubez et al. | 707/102 |
| 2006/0117046 | A1 * | 6/2006 | Robertson et al. | 707/101 |
| 2006/0250644 | A1 * | 11/2006 | Yamauchi et al. | 358/1.15 |
| 2007/0043864 | A1 * | 2/2007 | Nemoto | 709/225 |
| 2007/0136292 | A1 * | 6/2007 | Ohara | 707/9 |
| 2007/0143855 | A1 * | 6/2007 | Gilchrist et al. | 726/26 |
| 2007/0174896 | A1 * | 7/2007 | Furuya et al. | 726/1 |
| 2007/0208665 | A1 * | 9/2007 | Ohara | 705/51 |
| 2007/0266431 | A1 * | 11/2007 | Matsuda | 726/13 |
| 2007/0296932 | A1 * | 12/2007 | Suzuki | 355/18 |
| 2010/0064341 | A1 * | 3/2010 | Aldera | 726/1 |

FOREIGN PATENT DOCUMENTS

| | | | |
|---|---|---|---|
| JP | 2002-149468 A | 5/2002 | |
| JP | 2003-281148 A | 10/2003 | |
| JP | 2003-304352 A | 10/2003 | |
| JP | 2005-038371 A | 2/2005 | |

* cited by examiner

*Primary Examiner* — Michael Pyzocha
(74) *Attorney, Agent, or Firm* — Canon USA, Inc., IP Division

(57) ABSTRACT

A document management system configured to manage an access to a file includes a selection unit configured to select a virtual security policy for setting on the file, which is previously provided for each device, an acquisition unit configured to acquire access authority information for defining an authority for accessing the file based on the virtual security policy selected by the selection unit and authentication information about a user who has set the virtual security policy, a conversion unit configured to convert the virtual security policy into a real security policy that can be commonly interpreted by the document management system based on the access authority information acquired by the acquisition unit, and a management unit configured to set the real security policy converted by the conversion unit on the file to manage an access to the file.

17 Claims, 15 Drawing Sheets

FIG.15A

| ACCESS TYPE \ USER/GROUP | POLICY SETTING PERSON (VARIABLE) | MEMBER OF DEPARTMENT OF POLICY SETTING PERSON (VARIABLE) | OTHER USER OR GROUP |
|---|---|---|---|
| VIEW | ○ | ○ | × |
| EDIT | ○ | × | × |
| PRINT | ○ | ○ | × |
| SEND (TO DEVICE ONLY) | ○ | ○ | × |

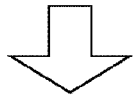

CONVERT VIRTUAL POLICY INTO REAL POLICY WHEN SUZUKI, MEMBER OF SALES DEPT. 1, HAS SELECTED VIRTUAL POLICY "CONFIDENTIAL OUTSIDE THE DEPARTMENT".

FIG.15B

| ACCESS TYPE \ USER/GROUP | SUZUKI (POLICY SETTING PERSON) | MEMBER OF SALES DEPARTMENT 1 (DEPARTMENT MEMBER) | OTHER USER OR GROUP |
|---|---|---|---|
| VIEW | ○ | ○ | × |
| EDIT | ○ | × | × |
| PRINT | ○ | ○ | × |
| SEND (TO DEVICE ONLY) | ○ | ○ | × |

DOCUMENT MANAGEMENT SYSTEM AND DOCUMENT MANAGEMENT METHOD

BACKGROUND OF THE INVENTION

1. Field of the Invention

The present invention relates to a document management system and a document management method configured to manage an access to a file.

2. Description of the Related Art

In recent years, information security has been considered more significant than ever. It is required that companies take effective measures against information leakage, in order to secure a sufficient protection of private information and to protect intellectual property rights. In this regard, a conventional system prevents information leakage by setting a security policy (hereinafter simply referred to as a "policy") including an access authority and a use authority for a specific user with respect to an electronic document.

For example, an access control management server has recently been marketed. Such an access control management server can set various access control for each user on a file. With the access control management server, a creator of a file can set access control on each user by designating a control level differently for respective users.

Adobe Systems Incorporated has marketed an access control management server "Live Cycle Policy Server", which can set access control described above on a portable document format (PDF) file. Microsoft Corporation has marketed an access control management server "Rights Management Services", which can set access control on a file generated using Microsoft Office application programs of Microsoft Corporation.

An access authority included in a policy registered on an access control management server can be set for each user, each user group, a specific period of time, a network, or a domain. With respect to a use authority, information about whether a file can be printed or transferred can be set. After a document has been distributed, a creator of the document can easily revoke or change the once-provided authority via an access control management server.

An administrator of an access control management server registers a policy to the access control management server. A general user can only acquire a list of policies that the user can set and utilize the acquired policy. When a general user applies a policy to a document, the user acquires from an access control management server a list of policies that the user can set and designates a policy from among those listed in the list.

Meanwhile, image data obtained by reading with a scanner connected to a network or with a multifunction peripheral (MFP) having a scanner function is often sent to a client computer by e-mail as an attached file. This common method of sending data has a problem in terms of information security, just as in the case of handling the above-described electronic document.

In this regard, a conventional method applies a security on image data read from a device, such as a scanner connected to a network or an MFP having a scanner function, using an access control management server as described above.

Japanese Patent Application Laid-Open No. 2003-304352 discusses a method for associating security information with image data in outputting the image data to an apparatus on a network. With this method, security information can be associated with an electronic document at the time of generation thereof.

Japanese Patent Application Laid-Open No. 2003-281148 discusses a method for generating access control information by reading an access control information entry sheet having a predetermined format at the same time as reading a document image and analyzing the read sheet. With this method, it is not necessary for a user to perform a setting via an operation panel. However, a user is required to fill in the sheet having the predetermined format with desired settings and then perform an operation for reading the sheet.

However, in the above-described conventional method for allowing a general user to select a policy from among those listed in a policy list acquired from an access control management server, contents of policies that can be set cannot be customized by a general user, who can only utilize the policies registered by an administrator.

In particular, it is necessary for a general user to designate access control information via an operation panel of a device. An operation panel of a device (e.g., MFP) is generally small-sized. Accordingly, with such a small size operation panel, it may be difficult for a user to perform a detailed setting for access control. That is, an operability of a conventional device (e.g., MFP) for setting access control is generally less than satisfactory.

With the above-described conventional method for allowing each user to designate a policy from a list of policies that can be set acquired from an access control management server, a user can designate detailed access control according to granularity of policies stored in the access control management server.

However, if an amount of data to be included in a list of policies substantially increases, the operability for setting access control may become increasingly more difficult. In addition, the above-described problem may arise on a personal computer (PC) of the user, not only on the device.

In the case of a conventional method for variably (dynamically) generating a policy selection menu based on a list of policies that can be selected by each user acquired from an access control management server, a long time may be required to generate a list of policies that can be selected by each user and to display the list on a user interface (UI), depending on a network environment.

In order to address this, it may be useful to acquire a list of all policies and to display the list on a UI instead of dynamically generating the list for each user. However, if the number of registered policies substantially increases, it may become increasingly more difficult for a user to find an appropriate policy to designate.

In the case of another conventional method for acquiring a list of policies by connecting to an access control management server, if a PC of a user cannot communicate with the access control management server, the user cannot set a policy registered on the access control management server on a document. In addition, if a communication error occurs between the PC and the access control management server, it may be necessary for a user of the PC to wait until the communication is restored and then to perform an operation for designating a policy again.

SUMMARY OF THE INVENTION

An embodiment of the present invention is directed to a document management system and a document management method configured to manage a document with a policy set according to a user environment, using a policy selection menu that can be customized by a user.

In addition, an embodiment of the present invention is directed to a document management system and a document management method configured to allow a user to select a policy from a simple policy selection menu, thus improving a user convenience.

Furthermore, an embodiment of the present invention is directed to a document management system and a document management method configured to display a policy selection menu in a very short time using the same policy selection menu for a plurality of devices.

Moreover, an embodiment of the present invention is directed to a document management system and a document management method configured to allow a user to select a policy even when a communication with an access control management server has failed, thus preventing requiring a user to select a policy again.

According to an aspect of the present invention, a document management system configured to manage an access to a file includes a selection unit configured to select a virtual security policy for setting on the file, which is previously provided for each device, an acquisition unit configured to acquire access authority information for defining an authority for accessing the file based on the virtual security policy selected by the selection unit and authentication information about a user who has set the virtual security policy, a conversion unit configured to convert the virtual security policy into a real security policy that can be commonly interpreted by the document management system based on the access authority information acquired by the acquisition unit, and a management unit configured to set the real security policy converted by the conversion unit on the file to manage an access to the file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 15A illustrates an example of a list of access rights (viewing, editing, printing, and sending (to a device only)) having a virtual policy "confidential outside the department" according to the first exemplary embodiment of the present invention.

FIG. 15B illustrates an example of processing for converting the virtual policy into a real policy according to the first exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
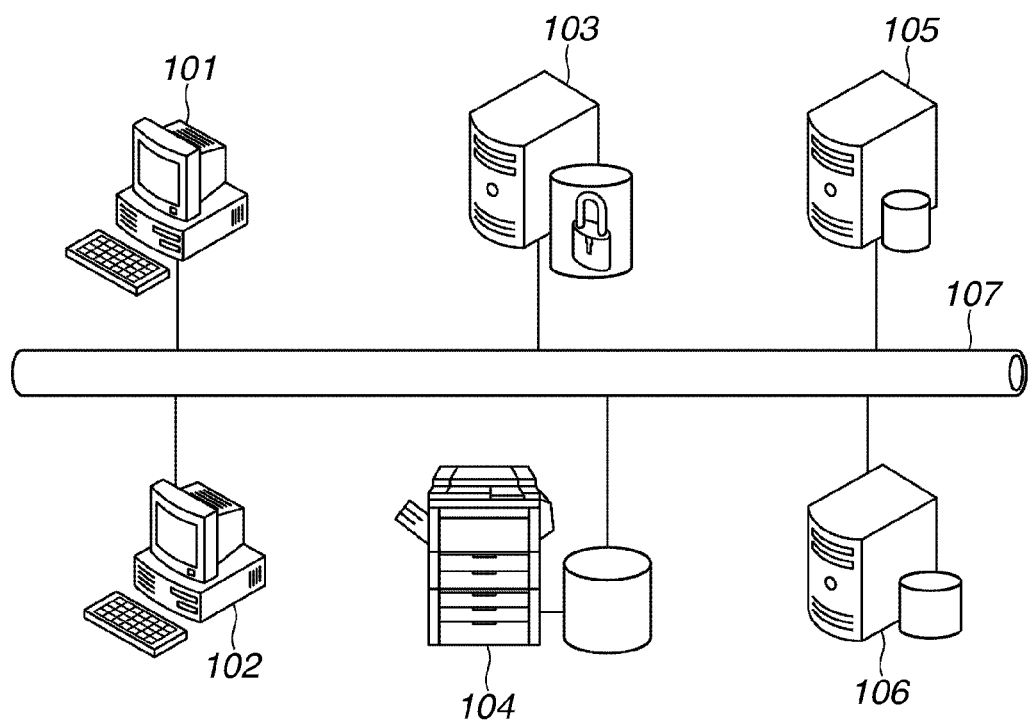
FIG. 1 illustrates an example of a configuration of a document management system according to a first exemplary embodiment of the present invention.

Now, a first exemplary embodiment of the present invention will be described below. FIG. 1 illustrates an example of a configuration of a document management system according to the first exemplary embodiment of the present invention.

Referring to FIG. 1, computers (information processing apparatuses) 101 and 102 are connected to a network 107, such as a local area network (LAN), a wide area network (WAN), or the Internet, via a network cable, such as an Ethernet cable, or a public line.

The computers 101 and 102 can execute various programs such as an application program. The computers 101 and 102 each include a program for setting access control information (security policy) on a document and referring to a document on which the access control information is set.

In an example illustrated in FIG. 1, the document management system includes a plurality of computers. However, one or more computers can be used in the document management system.

In the present exemplary embodiment, an information processing apparatus 103 serves as an access control management server. The access control management server 103 is connected to the network 107.

An image forming apparatus 104 is an MFP having functions as a print control apparatus, a scanner, and a copying machine. The MFP 104 is connected to the network 107. Thus, the access control information according to the present exemplary embodiment can be set to the MFP 104 having an operation unit and a display unit.

The image forming apparatus 104 is not limited to an MFP. That is, a single-function device, such as a scanner, can be connected to the network 107.

An information processing apparatus 105 functions as a directory server that provides a directory service for searching user information performed by a person who sets a policy, during processing for generating the access control information according to the present exemplary embodiment. The directory server 105 is connected to the network 107.

In the present exemplary embodiment, the directory server 105 serves as a server that provides a user information searching service according to the present exemplary embodiment. However, the directory server 105 is not always required to implement the functions of the document management system.

In the case where the directory server 105 is not used, the user information according to the present exemplary embodiment is stored in or on the access control management server 103, a storage device on the network 107, or a hard disk of a device.

An information processing apparatus 106 is a document server for storing a document according to the present exemplary embodiment. The document server 106 is connected to the network 107. In the present exemplary embodiment, the document server 106 serves as the document server for storing a document according to the present exemplary embodiment. However, the document server 106 is not always required to implement the functions of the document management system.

In the case where the document server 106 is not used, the document according to the present exemplary embodiment is stored in or on the computers 101 and 102, a file server, a storage device on the network 107, or a hard disk of a device.

The computers 101 and 102, the access control management server 103, the directory server 105, and the document server 106 each can be constituted by a common information processing apparatus.

A program for performing access control information setting processing can be installed on and executed by the computers 101 and 102, the access control management server 103, the directory server 105, the document server 106, and the MFP 104.

Figure 2:
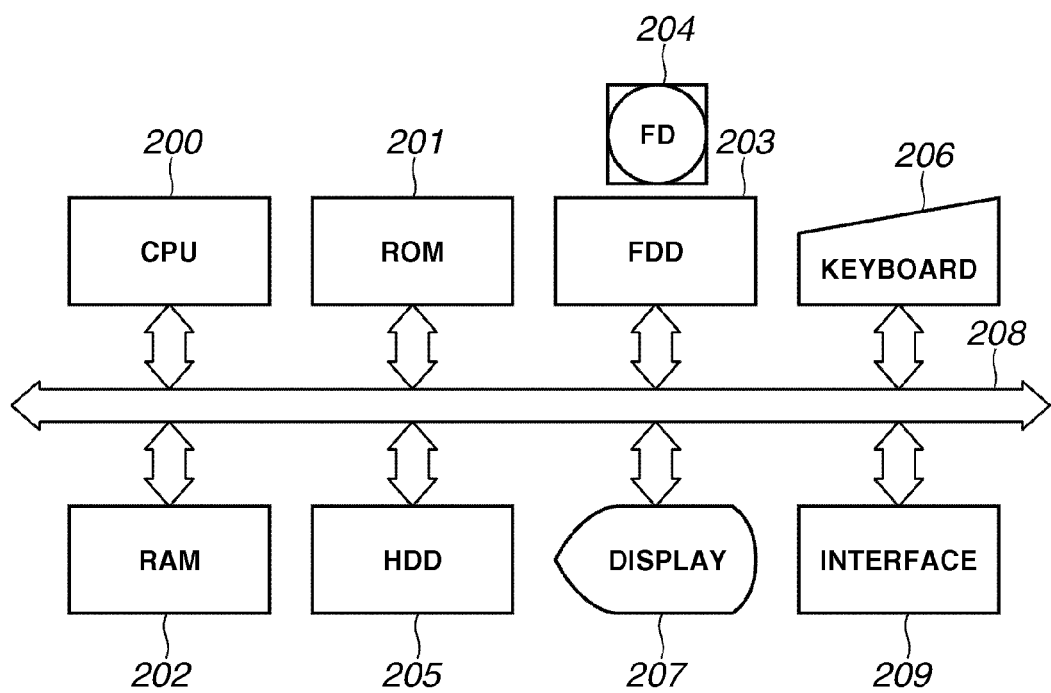
FIG. 2 illustrates an example of a configuration of a computer (information processing apparatus) according to the first exemplary embodiment of the present invention.

FIG. 2 illustrates an example of a configuration of a computer (information processing apparatus) according to the present exemplary embodiment.

In the present exemplary embodiment, the computers 101 and 102, the access control management server 103, the directory server 105, and the document server 106 have the same or similar hardware configuration. Accordingly, FIG. 1 illustrates an example of a configuration of the above-described apparatuses (the computers 101 and 102, the access control management server 103, the directory server 105, and the document server 106).

Referring to FIG. 2, a central processing unit (CPU) 200 is a control unit for controlling the information processing apparatus. The CPU 200 executes an application program, an operating system (OS), and a document management program stored on a hard disk drive (HDD) 205.

The CPU 200 controls a random access memory (RAM) 202 to temporarily store information and a file necessary to execute a program.

A read-only memory (ROM) 201 is a storage unit that stores a basic input and output (I/O) program. The RAM 202 temporarily stores information and data and serves as a main memory and a work area for the CPU 200.

Figure 6:
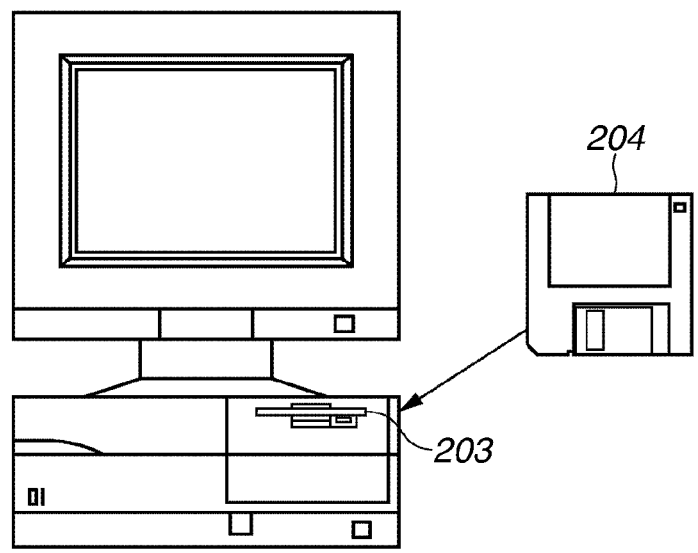
FIG. 6 illustrates a state in which the FD is inserted into a floppy disk drive (FDD) illustrated in FIG. 2 according to the first exemplary embodiment of the present invention.

An FDD 203 is a storage medium reading unit. The CPU 200 loads a program stored on a floppy disk (FD) (storage medium) 204 via the FDD 203 on the RAM 202, as illustrated in FIG. 6.

As the storage medium, a compact disc-read only memory (CD-ROM), a CD-recordable (CD-R), a CD-rewritable (CD-RW), a PC card, a digital versatile disc (DVD), an integrated circuit (IC) card, an magneto-optical disc (MO), or a memory stick can be used, in addition to the FD.

The FD 204 stores a computer-readable program. The HDD 205 is a mass-storage memory (external storage unit) that stores an application program, an OS, a document management program, and a related program.

A keyboard (instruction input unit) 206 can be operated by a user to issue various instructions for designating a policy to the computer (information processing apparatus). A display (display unit) 207 displays a setting screen and acquired information.

Components of each of the computers 101 and 102, the access control management server 103, the directory server 105, and the document server 106, such as the CPU 200, the ROM 201, the RAM 202, the FDD 203, the HDD 205, the keyboard 206, the display 207, and an interface (I/O unit) 209 are in communication with one another via a system bus 208 to send and receive data therebetween.

The information processing apparatus can perform a data communication with an external apparatus via the interface 209.

Figure 3:
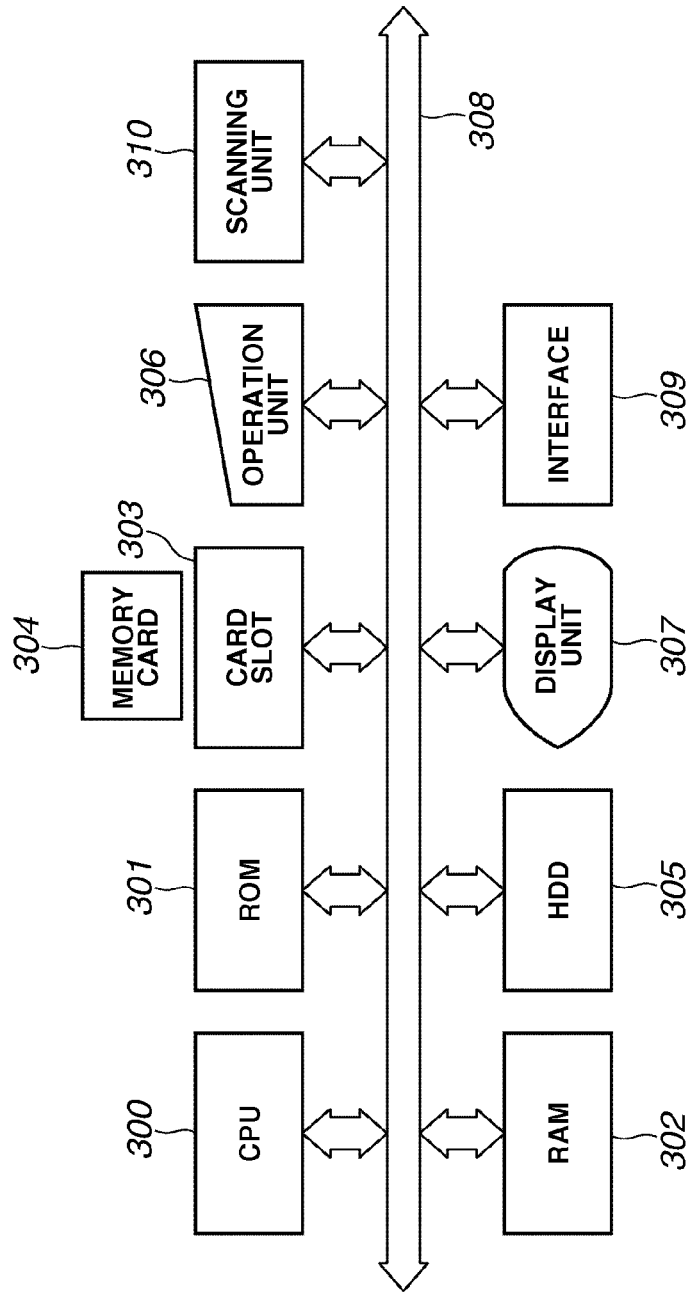
FIG. 3 illustrates an example of a configuration of an image forming apparatus (MFP) according to the first exemplary embodiment of the present invention.

FIG. 3 illustrates an example of a configuration of the image forming apparatus (MFP) 104 according to the present exemplary embodiment.

Referring to FIG. 3, a CPU 300 is a control unit of the image forming apparatus 104. The CPU 300 executes various control programs, various application programs, an OS, and a document management program stored on an HDD 305. The CPU 300 controls a RAM 302 to temporarily store information and a file necessary to execute a program.

A ROM 301 is a storage unit that stores a program, such as a device control program and a basic I/O program. The RAM 302 temporarily stores information and data and serves as a main memory and a work area for the CPU 300.

A card slot 303 is a storage medium reading unit. The CPU 300 can load a program stored on a memory card (storage medium) 304 on the image forming apparatus 104 and acquire a document file (data) via the card slot 303. As the storage medium (the memory card 304), an FD, a CD-R, a CD-RW, a PC card, a DVD, an IC memory card, an MO, and a memory stick can be used.

The memory card 304 stores a computer-readable program. The HDD 305 is a mass-storage memory (external storage unit) that stores an application program, an OS, a document management program, and a related program.

A keyboard (instruction input unit) 306 can be operated by a user to issue various instructions for designating a policy to the MFP (the image forming apparatus 104). A display (display unit) 307 displays a setting screen and acquired information.

Components of the image forming apparatus 104, such as the CPU 300, the ROM 301, the RAM 302, the card slot 303, the HDD 305, the keyboard 306, the display 307, and an interface (I/O unit) 309 are in communication with one another via a system bus 308 to send and receive data therebetween.

The image forming apparatus 104 can perform a data communication with an external apparatus via the interface 309.

The CPU 300 can obtain image data of a paper document by scanning the paper document with a scanning unit 310. That is, the scanning unit 310 photoelectrically converts reflection light from a paper document to generate image data of the paper document. The CPU 300 of the image forming apparatus 104 forms an image using the RAM 302 as a work area. The RAM 302 stores generated image data on the HDD 305 as a document (file).

Figure 4:
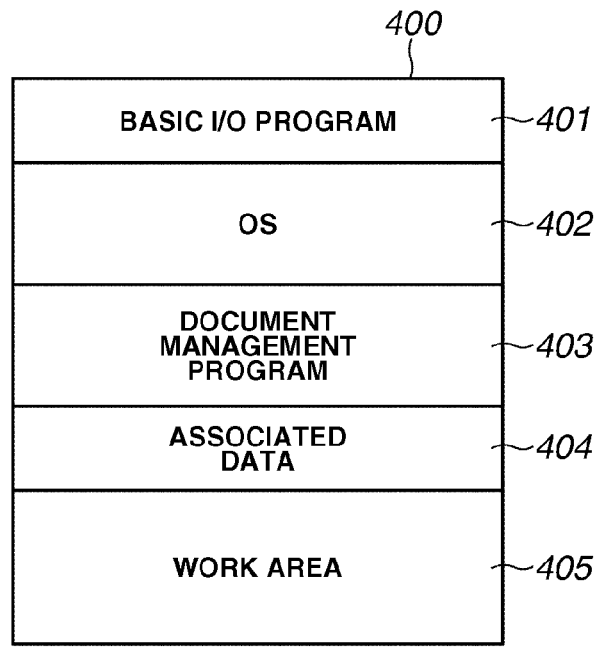
FIG. 4 illustrates an example of a memory map for the computer (information processing apparatus) and the image forming apparatus illustrated in FIGS. 2 and 3 according to the first exemplary embodiment of the present invention.

FIG. 4 illustrates an example of a memory map 400 for the computer (the computers 101 and 102, the access control management server 103, the directory server 105, and the document server 106) and the image forming apparatus 104 according to the present exemplary embodiment.

Referring to FIG. 4, a basic I/O program 401 loads an operating system (OS) from the HDD 205 or the HDD 305 on the RAM 202 or the RAM 302 when the computer (the computers 101 and 102, the access control management server 103, the directory server 105, and the document server 106) or the image forming apparatus 104 is powered on. The basic I/O program 401 includes a program having an initial program loading (IPL) function, which activates the OS.

An OS 402 and a document management program 403 are stored in a specific area of the RAM 202 or the RAM 302.

Associated data 404 is stored in a specific area of the RAM 202 or the RAM 302. A work area 405 is a specific area for storing the document management program 403 in executing the document management program 403 with the CPU 200 or the CPU 300.

Figure 5:
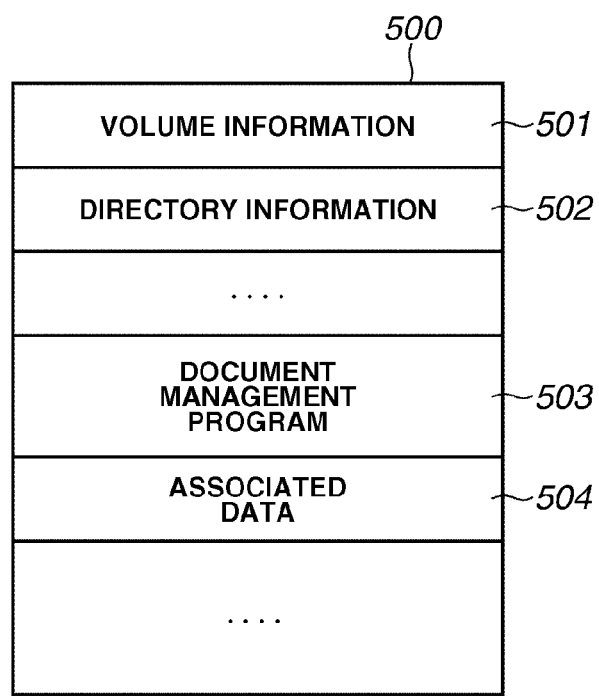
FIG. 5 illustrates an example of a memory map for a floppy disk (FD) illustrated in FIG. 2 according to the first exemplary embodiment of the present invention.

FIG. 5 illustrates an example of a memory map for the FD 204 (FIG. 2) according to the present exemplary embodiment.

Referring to FIG. 5, the FD 204 includes data content 500. The data content 500 includes volume information 501, which indicates data information, directory information 502, a document management program 503, and associated data 504, which is associated with the document management program 503.

FIG. 6 illustrates a state in which the FD 204 is inserted into the FDD 203 (FIG. 2) according to the present exemplary embodiment. In an example illustrated in FIG. 6, components similar to those in FIG. 2 are provided with the same reference numeral.

Referring to FIG. 6, the FD 204 stores the document management program 503 and the associated data 504 according to the present exemplary embodiment.

Figure 7:
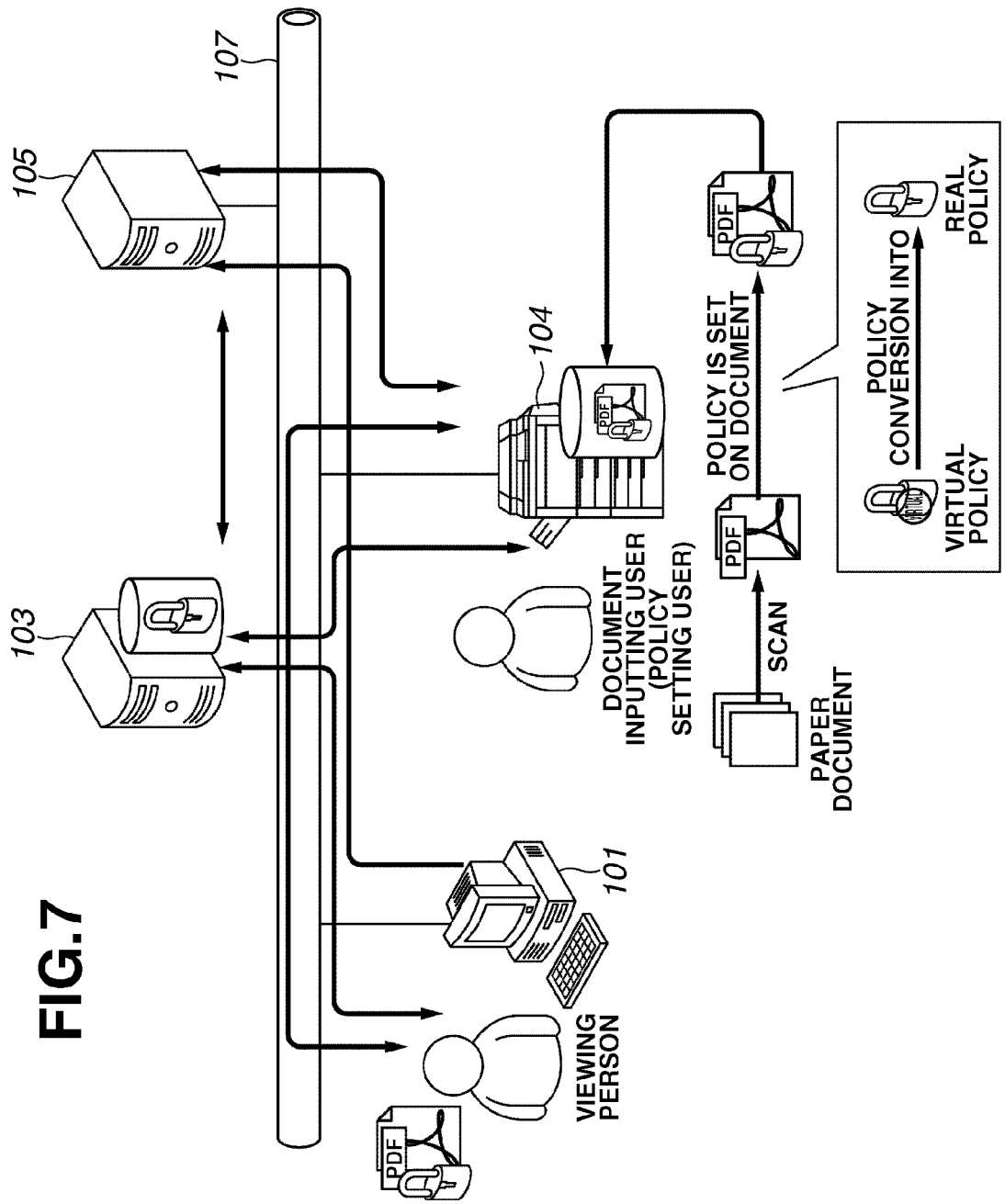
FIG. 7 illustrates an example of a flow of processing performed by the document management system according to the first exemplary embodiment of the present invention.

FIG. 7 illustrates an example of a flow of processing performed by the document management system according to the present exemplary embodiment.

In the example illustrated in FIG. 7, a document is scanned by the image forming apparatus (MFP) 104, access control information is applied to image data (file) obtained by reading the document, and the image data having the access control information is stored on the HDD 305 of the image forming apparatus 104. In the example in FIG. 7, components similar to those in FIG. 1 are provided with the same reference numerals.

The document management program 503 operates on the image forming apparatus (MFP) 104. A user can perform various operations, such as an authentication operation and a virtual policy selection operation, via a UI screen displayed on the display unit 307 of the image forming apparatus 104.

A "virtual policy" refers to a provisional security policy provided in common to each device, such as the computer (the computers 101 and 102, the access control management server 103, the directory server 105, and the document server 106) and the image forming apparatus (MFP) 104. The virtual policy is customized for each user of the computer (the computers 101 and 102, the access control management server 103, the directory server 105, and the document server 106) and the image forming apparatus (MFP) 104.

A "real policy" refers to a security policy that can be interpreted by both the document management system and the document management program 503 according to the present exemplary embodiment.

The virtual policy is converted into a real policy that can be interpreted by both the document management system and the document management program 503 based on information about an access right (information about a control of an access to a file) managed by the document management system or the document management program 503.

The access right information includes information about an accessible range (a user group, a department, or a company to which an access is permitted (or restricted)), based on authentication information about a person who has set a virtual policy, in addition to information for controlling editing and viewing.

The scanning unit 310 of the image forming apparatus (MFP) 104 reads a document. The CPU 300 sets a virtual policy designated by a user on image data (file) of the document read by the scanning unit 310.

The CPU 300 of the image forming apparatus (MFP) 104 issues a request for converting a policy to the access control management server 103. The access control management server 103, according to the received policy conversion request from the image forming apparatus (MFP) 104, converts the virtual policy into a real policy. Then, the access control management server 103 sends the converted real policy to the image forming apparatus (MFP) 104.

The directory server 105 stores user information. The directory server 105 can send information as a response to a request for user information and group information from the access control management server 103.

When a viewer (editor who edits a file) issues a request for viewing a file stored in the image forming apparatus (MFP) 104 via the computer 101, the viewer (editor) issues an inquiry to the access control management server 103. After receiving the inquiry, the access control management server 103 performs an access authentication for viewing the file stored in the image forming apparatus (MFP) 104.

In the example illustrated in FIG. 7, the HDD 305 of the image forming apparatus (MFP) 104 stores the data. However, the data can be stored in a storage area or an arbitrary storage device, such as a shared folder on the network 107, the document server 106, or a file server.

The function for scanning a document and storing the read image of the document on an arbitrary storage device (storage area) is hereinafter referred to as a "scan and storage function". In the case of utilizing a scan and send function, a BOX sending function, or a BOX file setting function, a user can apply access control information on data via the image forming apparatus (MFP) 104.

The scan and send function refers to a function for sending a file including data obtained by scanning a document to an arbitrary e-mail address by e-mail.

The BOX sending function refers to a function for sending the data file stored on the HDD (BOX) 305 of the image forming apparatus (MFP) 104 to an arbitrary e-mail address by e-mail, as in the case of the scan and send function.

The BOX file setting function refers to a function for setting access control information on the data file stored on the HDD (BOX) 305 of the image forming apparatus (MFP) 104.

Figure 8:
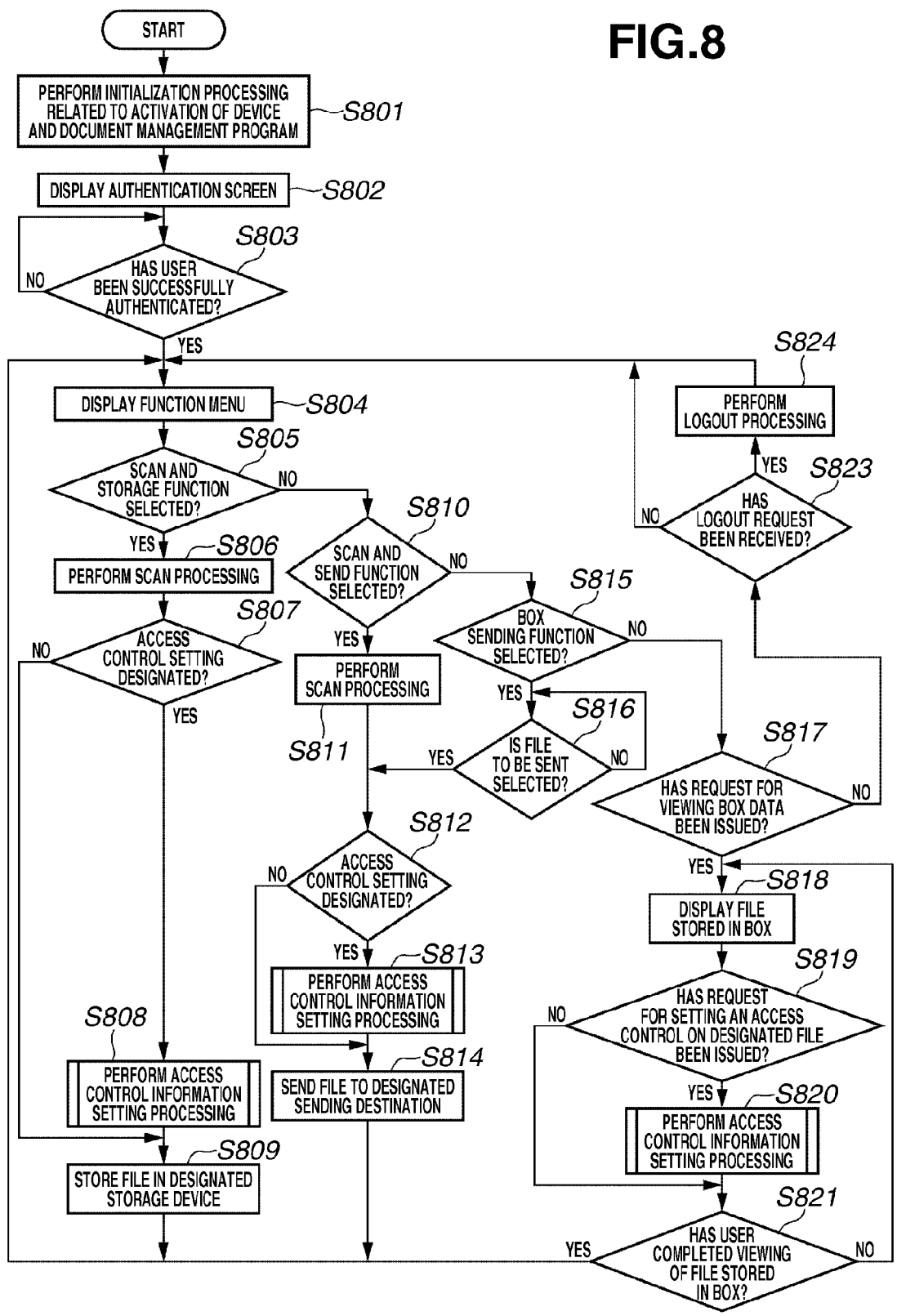
FIG. 8 is a flow chart illustrating an example of processing for setting access control information on the image forming apparatus (MFP) according to the first exemplary embodiment of the present invention.

FIG. 8 is a flow chart illustrating an example of processing for setting access control information on the image forming apparatus (MFP) 104 according to the present exemplary embodiment. The processing performed by the image forming apparatus (MFP) 104 is implemented with the CPU 300 of the image forming apparatus (MFP) 104.

Referring to FIG. 8, in step S801, the CPU 300 performs initialization processing necessary for activating the device and the document management program 503.

In step S802, the CPU 300 displays an authentication screen on the display unit 307.

In step S803, the CPU 300 determines whether a user has successfully logged into the image forming apparatus (MFP) 104 by an operation via the authentication screen. If it is determined in step S803 that the user has not been successfully logged into the image forming apparatus (MFP) 104 (NO in step S803), then the CPU 300 waits until a user logs into the image forming apparatus (MFP) 104, continuing displaying the authentication screen. On the other hand, if it is determined in step S803 that the user has successfully logged into the image forming apparatus (MFP) 104 (YES in step S803), then the CPU 300 advances to step S804.

In step S804, the CPU 300 displays a function menu on the display unit 307. The user can designate a desired function via the function menu display screen.

In step S805, the CPU 300 determines whether the user has selected the scan and storage function from among the functions in the function menu. If it is determined in step S805 that the user has selected the scan and storage function (YES in step S805), then the CPU 300 advances to step S806. In step S806, the CPU 300 scans a document and temporarily stores image data obtained by scanning the document on the HDD 305.

In step S807, the CPU 300 determines whether the user has designated a setting for access control. If it is determined in step S807 that the user has designated a setting for access control (YES in step S807), then the CPU 300 advances to step S808. In step S808, the CPU 300 performs access control information setting processing. The access control information setting processing will be described below with reference to the flow chart of FIG. 9.

Then, the CPU 300 advances to step S809. In step S809, the CPU 300 stores the file in a designated storage device (storage area), and then returns to step S804.

The file can be stored in any storage area or storage device that can be accessed by the user. That is, the user can store the file on the HDD 305, a file server, or the document server 106.

In step S809, the CPU 300 stores in the designated storage device (storage area) the file to which the real policy converted from the virtual policy by the access control information setting processing is applied.

On the other hand, if it is determined in step S805 that the user has not selected the scan and storage function (NO in step S805), then the CPU 300 advances to step S810.

In step S810, the CPU 300 determines whether the user has selected the scan and send function from among the functions in the function menu.

If it is determined in step S810 that the user has selected the scan and send function (YES in step S810), then the CPU 300 advances to step S811. In step S811, the CPU 300 scans a document and temporarily stores image data obtained by the scanning on the HDD 305.

In step S812, the CPU 300 determines whether the user has designated a setting for access control. If it is determined in step S812 that the user has designated a setting for access control (YES in step S812), then the CPU 300 advances to step S813. In step S813, the CPU 300 performs the access control information setting processing.

Then, the CPU 300 advances to step S814. In step S814, the CPU 300 sends the file to a designated sending destination, and then returns to step S804.

In step S814, the CPU 300 sends to the designated sending destination the file to which the real policy converted from the virtual policy by the access control information setting processing is applied.

On the other hand, if it is determined in step S810 that the user has not selected the scan and send function (NO in step S810), then the CPU 300 advances to step S815.

In step S815, the CPU 300 determines whether the user has selected the BOX sending function from among the functions in the function menu.

If it is determined in step S815 that the user has selected the BOX sending function (YES in step S815), then the CPU 300 advances to step S816. In step S816, the CPU 300 displays a file selection screen on the display unit 307 and determines whether the user has selected a file to be sent to a BOX via the file selection screen.

If it is determined in step S816 that the user has not selected a file to be sent to a BOX (NO in step S816), then the CPU 300 waits until a user selects a file to be sent to a BOX, continuing displaying the file selection screen on the display unit 307. On the other hand, if it is determined in step S816 that the user has selected a file to be sent to a BOX (YES in step S816), then the CPU 300 advances to step S812.

If it is determined in step S812 that the user has designated a setting for access control (YES in step S812), then the CPU 300 advances to step S813.

In step S813, the CPU 300 performs the access control information setting processing on the selected file, and then advances to step S814. In step S814, the CPU 300 sends the file to the designated sending destination. Then, the CPU 300 returns to step S804.

On the other hand, if it is determined in step S815 that the user has not selected the BOX sending function (NO in step S815), then the CPU 300 advances to step S817.

In step S817, the CPU 300 determines whether the user has issued a request for viewing BOX data via the function menu.

If it is determined in step S817 that the user has issued a request for viewing BOX data (YES in step S817), then the CPU 300 advances to step S818. In step S818, the CPU 300 displays the file stored in the HDD (BOX) 305 on the display unit 307.

In step S819, the CPU 300 determines whether the user has issued a request for setting access control on the designated file. If it is determined in step S819 that the user has not issued a request for setting access control on the designated file (NO in step S819), then the CPU 300 advances to step S821.

On the other hand, if it is determined in step S819 that the user has issued a request for setting access control on the designated file (YES in step S819), then the CPU 300 advances to step S820. In step S820, the CPU 300 performs the access control information setting processing. A real policy converted from the virtual policy is set on the file by the access control information setting processing.

Then, the CPU 300 advances to step S821. In step S821, the CPU 300 determines whether the user has designated a completion of the BOX file viewing request.

If it is determined in step S821 that the user has designated a completion of the BOX file viewing request (YES in step S821), then the CPU 300 returns to step S804.

On the other hand, if it is determined in step S821 that the user has not designated a completion of the BOX file viewing request (NO in step S821), then the CPU 300 returns to step S818. In step S818, the CPU 300 displays another file stored in the HDD (BOX) 305 on the display unit 307.

On the other hand, if it is determined in step S817 that the user has not requested viewing BOX data via the function menu (NO in step S817), then the CPU 300 advances to step S823.

In step S823, the CPU 300 determines whether the user has selected logging out from the image forming apparatus (MFP) 104 via the function menu. If it is determined in step S823 that the user has selected logging out from the image forming apparatus (MFP) 104 (YES in step S823), then the CPU 300 advances to step S824. In step S824, the CPU 300 performs the selected logout processing. On the other hand, if it is determined in step S823 that the user has not selected logging out from the image forming apparatus (MFP) 104 (NO in step S823), then the CPU 300 returns to step S804. In this case, the CPU 300 repeats the processing in step S804 and subsequent steps.

Now, the access control information setting processing will be described below.

Figure 9:
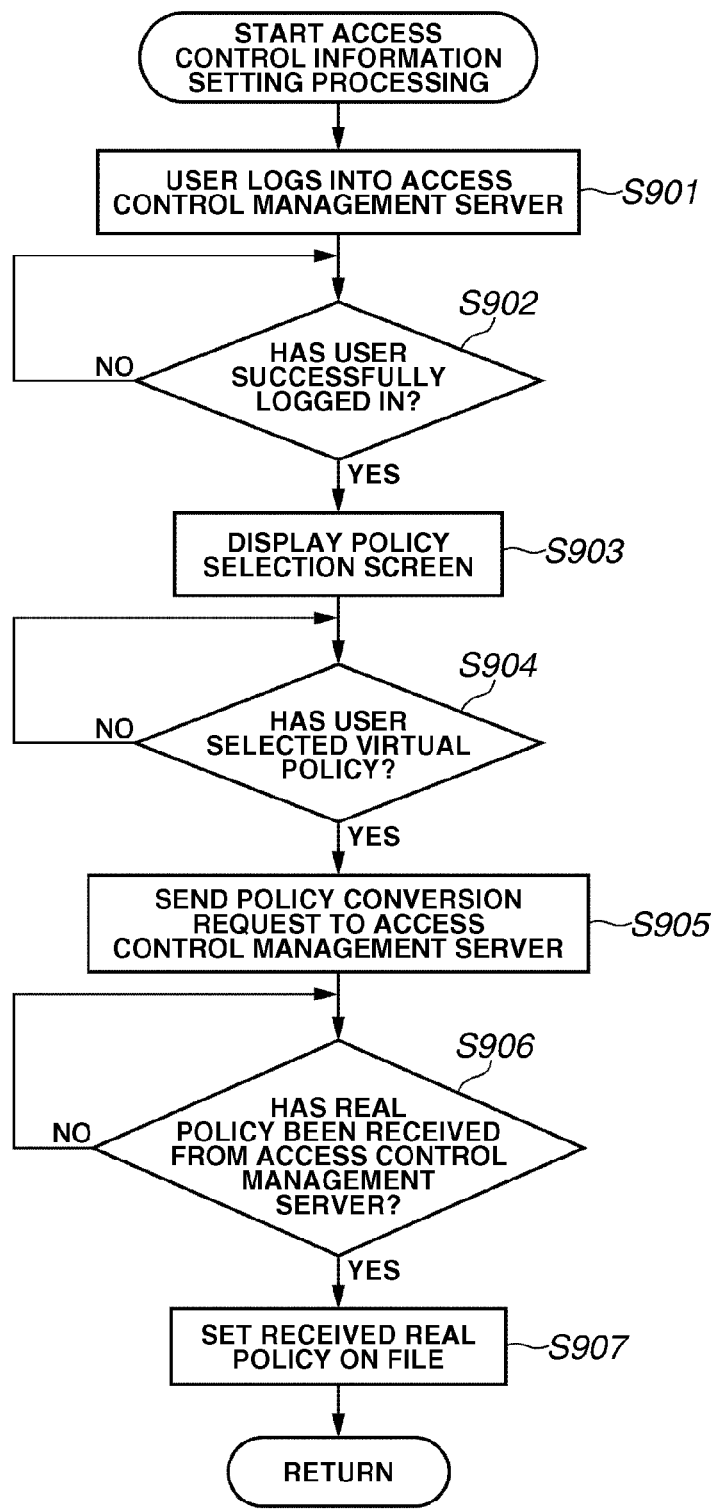
FIG. 9 is a flow chart illustrating an example of access control information setting processing according to the first exemplary embodiment of the present invention.

FIG. 9 is a flow chart illustrating an example of access control information setting processing according to the present exemplary embodiment.

Referring to FIG. 9, in step S901, the user logs into the access control management server 103. In step S902, the CPU 300 determines whether the user has been successfully logged into the access control management server 103. Here, if the authentication processing in step S803 (FIG. 8) and that in step S901 by the access control management server 103 are the same processing, the processing in steps S901 and S902 can be omitted.

If it is determined in step S902 that the user has been successfully logged into the access control management server 103 (YES in step S902), then the CPU 300 advances to step S903. In step S903, the CPU 300 displays a policy selection screen displaying a list of virtual policies on the display unit 307.

The virtual policy list displayed in step S903 has been previously set on the device (the image forming apparatus).

Figure 13:
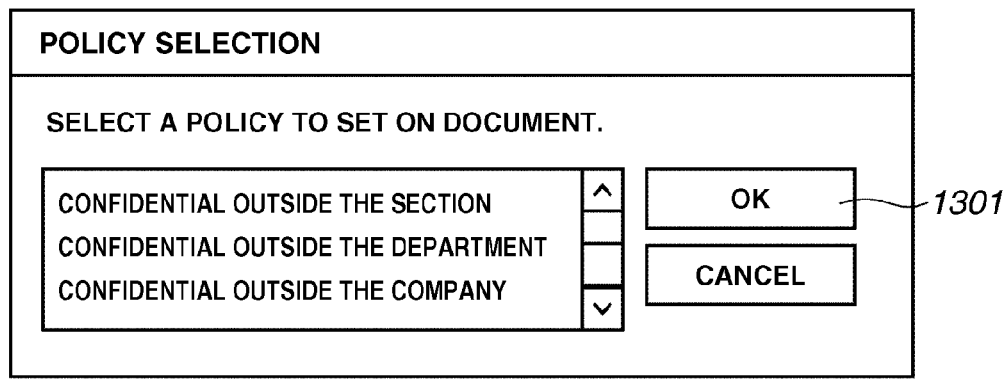
FIG. 13 illustrates an example of a virtual policy selection screen including a list of virtual policies according to the first exemplary embodiment of the present invention.

FIG. 13 illustrates an example of the virtual policy selection screen including the list of virtual policies.

In the example illustrated in FIG. 13, the virtual policies, such as "confidential outside the section", "confidential outside the department", and "confidential outside the company", are displayed. A user who sets a policy selects one from those in the list. The user can select any one of the displayed virtual policies by pressing an OK button 1301.

After the processing in step S903 (FIG. 9), the CPU 300 advances to step S904. In step S904, the CPU 300 determines whether the user has selected a virtual policy via the virtual policy selection screen. If it is determined in step S904 that the user has not selected a virtual policy via the virtual policy selection screen (NO in step S904), then the CPU 300 waits until the user selects a virtual policy.

On the other hand, if it is determined in step S904 that the user has selected a virtual policy via the virtual policy selection screen (YES in step S904), then the CPU 300 advances to step S905. In step S905, the CPU 300 issues a policy conversion request to the access control management server 103.

When the user has selected a virtual policy, the CPU 300 can read setting information (e.g., accessible virtual group information) associated with the selected virtual policy from the HDD 305.

If the selected virtual policy requires setting information for the virtual policy, the CPU 300 sends the virtual policy setting information together with the virtual policy to the access control management server 103.

If the selected virtual policy requires information about the user who has selected the policy (or a user who has scanned the document and input the image data of the scanned document), the CPU 300 sends information about the policy selecting user (policy selecting user information) to the access control management server 103 as well.

After receiving the policy conversion request, the access control management server 103 converts the received virtual policy into a real policy that can be interpreted by the access control management server 103.

A flow of processing for converting the virtual policy into a real policy by the access control management server 103 will be described below with reference to the flow chart of FIG. 10.

In step S906, the CPU 300 determines whether the real policy has been received from the access control management server 103. If it is determined in step S906 that the real policy has not been received from the access control management server 103 (NO in step S906), then the CPU 300 waits until the real policy is received.

On the other hand, if it is determined in step S906 that the real policy has been received from the access control management server 103 (YES in step S906), then the CPU 300 advances to step S907. In step S907, the CPU 300 sets the received real policy (access control information) on the file of image data obtained by scanning the document.

The CPU 300 sets the converted real policy on the file, and then stores the file having the real policy on the HDD 305. The access authority to the stored file is managed by the access control management server 103.

Now, the flow of processing by the access control management server 103 will be described below with reference to FIG. 10.

Figure 10:
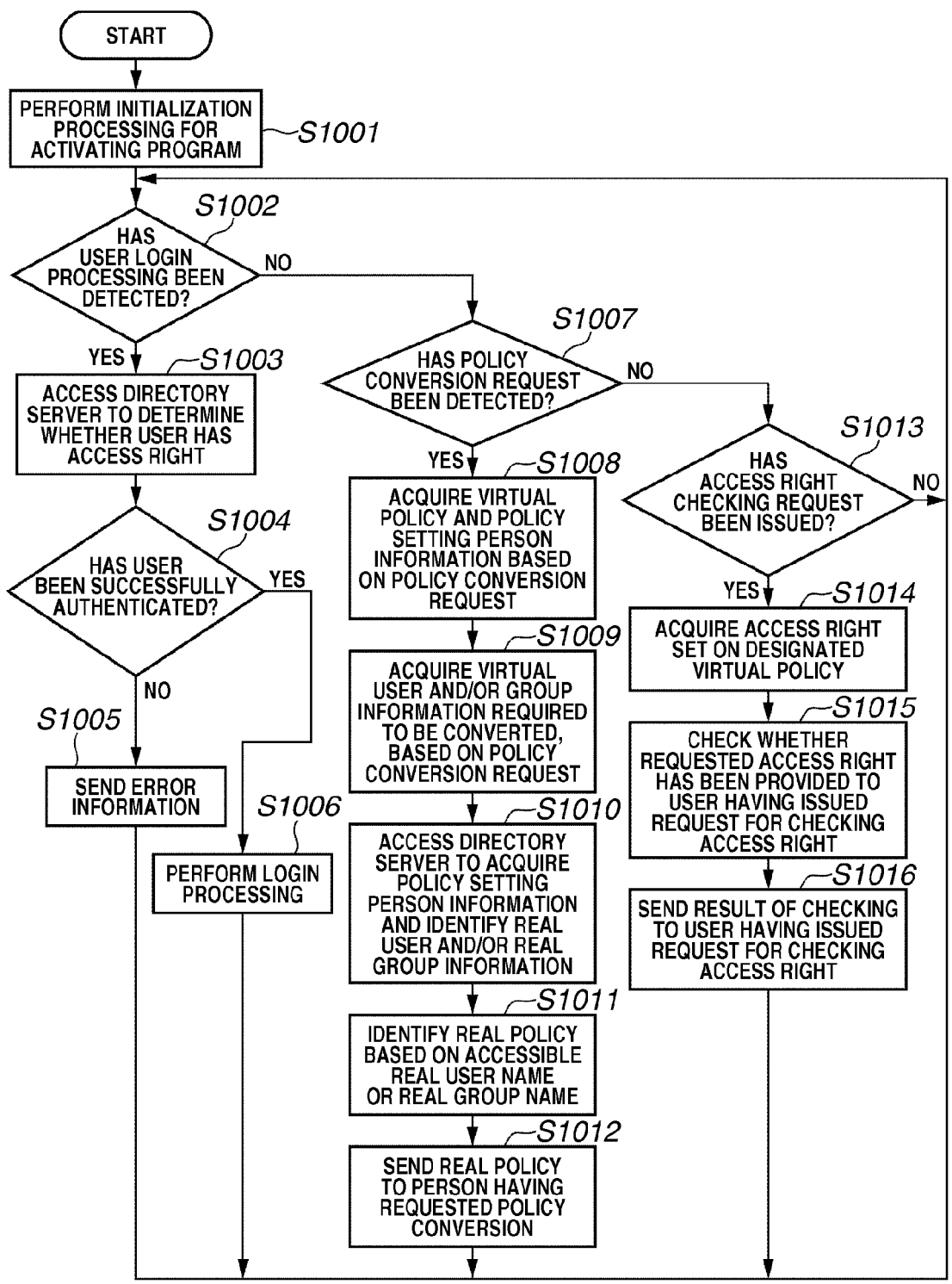
FIG. 10 is a flow chart illustrating an example of processing performed by an access control management server according to the first exemplary embodiment of the present invention.

FIG. 10 is a flow chart illustrating an example of processing by the access control management server 103 according to the present exemplary embodiment. The processing in FIG. 10 is implemented with the CPU 200 of the access control management server 103.

Referring to FIG. 10, in step S1001, the CPU 200 performs initialization processing necessary for activating the document management program 503.

In step S1002, the CPU 200 determines whether a user request for logging into the access control management server 103 has been detected. If it is determined in step S1002 that a user request for logging into the access control management server 103 has been detected (YES in step S1002), then the CPU 200 advances to step S1003.

In step S1003, the CPU 200 accesses the directory server 105 to check whether the user (the policy setting user or the user who has scanned the document and input the image data obtained by scanning the document) has an access right.

In the present exemplary embodiment, the directory server 105, which provides a general searching service, stores the information about the access right of the user. However, another device, such as an authentication server capable of authenticating a user, can store the information about the access right of the user.

In step S1004, the CPU 200 receives a result of the authentication and determines whether the user has been successfully authenticated. If it is determined in step S1004 that the user has been successfully authenticated (YES in step S1004), then the CPU 200 advances to step S1006. In step S1006, the CPU 200 performs processing necessary for allowing the user to log into the access control management server 103. Then, the CPU 200 returns to step S1002.

On the other hand, if it is determined in step S1004 that the user has not been successfully authenticated (NO in step S1004), then the CPU 200 advances to step S1005. In step S1005, the CPU 200 sends authentication error information to a policy conversion request source device. Then, the CPU 200 returns to step S1002.

On the other hand, if it is determined in step S1002 that a user request for logging into the access control management server 103 has not been detected (NO in step S1002), then the CPU 200 advances to step S1007.

In step S1007, the CPU 200 determines whether a policy conversion request has been detected. If it is determined in step S1007 that a policy conversion request has been detected (YES in step S1007), then the CPU 200 advances to step S1008.

In step S1008, the CPU 200 acquires the virtual policy designated in the policy conversion request and information about the policy setting user who has selected (set) the virtual policy (policy selecting user information).

The access control management server 103 has a list of access rights (FIG. 15A) set for each virtual policy in a database stored on the HDD 205. The access right list includes access authority information that defines an authority for accessing a file.

The access authority information includes information defining a type of access to a file and information about a user group whose access to the file is restricted.

In step S1009, the CPU 200 of the access control management server 103 reads information about the virtual policy designated from those in the list and acquires information about a virtual user and/or group that requires a policy conversion.

The virtual user/group information includes information about a "policy setting user" and a "member of a department of the policy setting user", in the example in FIG. 15A.

In step S1010, the CPU 200 acquires from the directory server 105 the information about the policy setting user who is a virtual user and/or a user in the virtual group, which is required for the policy conversion, and identifies information about an actually existing real user and/or real group.

In step S1011, the CPU 200 identifies a real policy based on an accessible real user name/group name.

In step S1012, the CPU 200 sends the real policy identified in step S1011 to the policy conversion requesting user. Then, the CPU 200 returns to step S1002.

Figure 14:
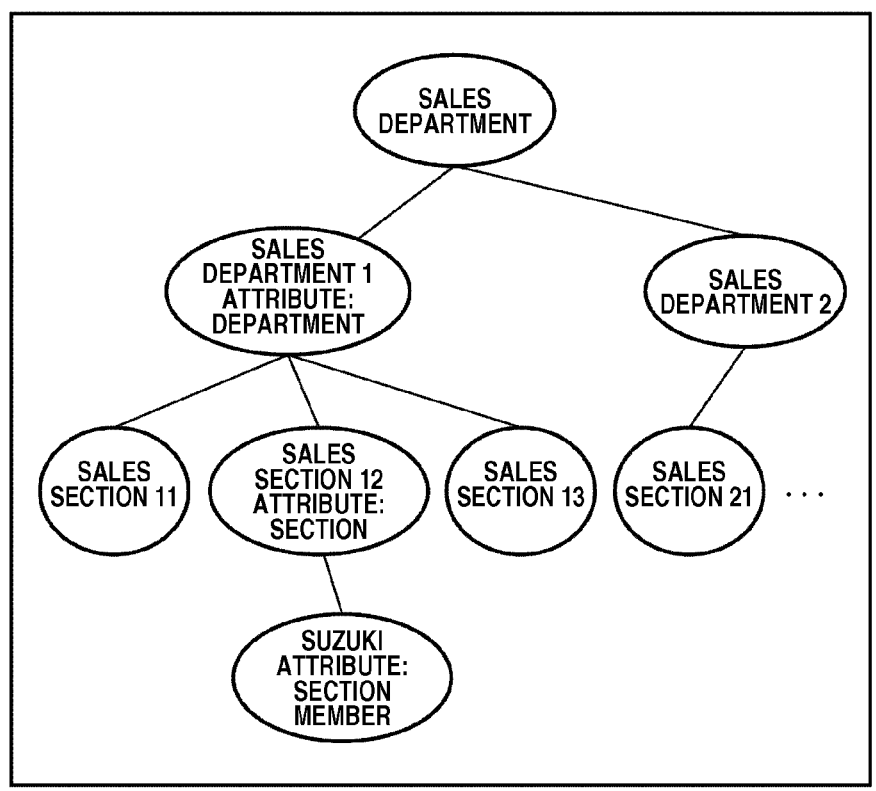
FIG. 14 illustrates an example of user information and group information stored in a directory server according to the first exemplary embodiment of the present invention.

As illustrated in FIG. 14, the directory server 105 stores user information and group information having a tree structure. By tracing links in the tree structure from a section member, to a section, and then to a department, information about a higher-rank attribute can be acquired.

FIG. 15A illustrates an example of a list of access rights (viewing, editing, printing, and sending (to a device only)) having the virtual policy "confidential outside the department" according to the present exemplary embodiment.

In the example illustrated in FIG. 15A, all of the access rights have been provided to the policy setting user, as illustrated with circles. Access rights other than the editing right have been provided to members of the department to which the policy setting user belongs. Users other than those described above have not been provided with any access right.

Here, the "policy setting person" and the "member of the department to which the policy setting person belongs" are the information required to be converted.

Suppose that a person "SUZUKI" requests a policy conversion as in FIG. 14, the department to which the person "SUZUKI" belongs is the "Sales Department 1" (FIG. 14). FIG. 15B illustrates an example of processing for converting the virtual policy into a real policy when the person "SUZUKI", who is a member of the "Sales Department 1", has selected the virtual policy "confidential outside the department", according to the present exemplary embodiment. In the example illustrated in FIG. 15B, the "policy setting person" is converted into "SUZUKI", and the "member of the department to which the policy setting person belongs" is converted into "member of Sales Department 1".

Referring back to FIG. 10, if it is determined in step S1007 that a policy conversion request has not been detected (NO in step S1007), then the CPU 200 advances to step S1013.

The CPU 200 determines whether the user has an access right to the file having the real policy according to authentication information about the user accessing the file.

In step S1013, the CPU 200 determines whether a request for checking an access right with respect to the designated virtual policy has been issued.

If it is determined in step S1013 that a request for checking an access right with respect to the designated virtual policy has been issued (YES in step S1013), then the CPU 200 advances to step S1014.

In step S1014, the CPU 200 refers to the list stored in a database and acquires information about an access right of the user or the group set on the designated virtual policy.

In step S1015, the CPU 200 checks whether the requested access right has been provided to the user who has issued the request for checking the access right.

In step S1016, the CPU 200 sends a result of the checking for the access right in step S1015 to the access right checking requesting user. Then, the CPU 200 returns to step S1002.

On the other hand, if it is determined in step S1013 that a request for checking an access right with respect to the designated virtual policy has not been issued (NO in step S1013), then the CPU 200 returns to step S1002. Then, the CPU 200 repeats the processing in step S1002 and subsequent steps.

Now, processing by a user PC (the computer 101 or 102 in FIG. 1) which issues a request for accessing a file having access control information will be described below with reference to the flow chart of FIG. 11. The processing in FIG. 11 is implemented with the CPU 200 of the computer 101 or the computer 102.

Figure 11:
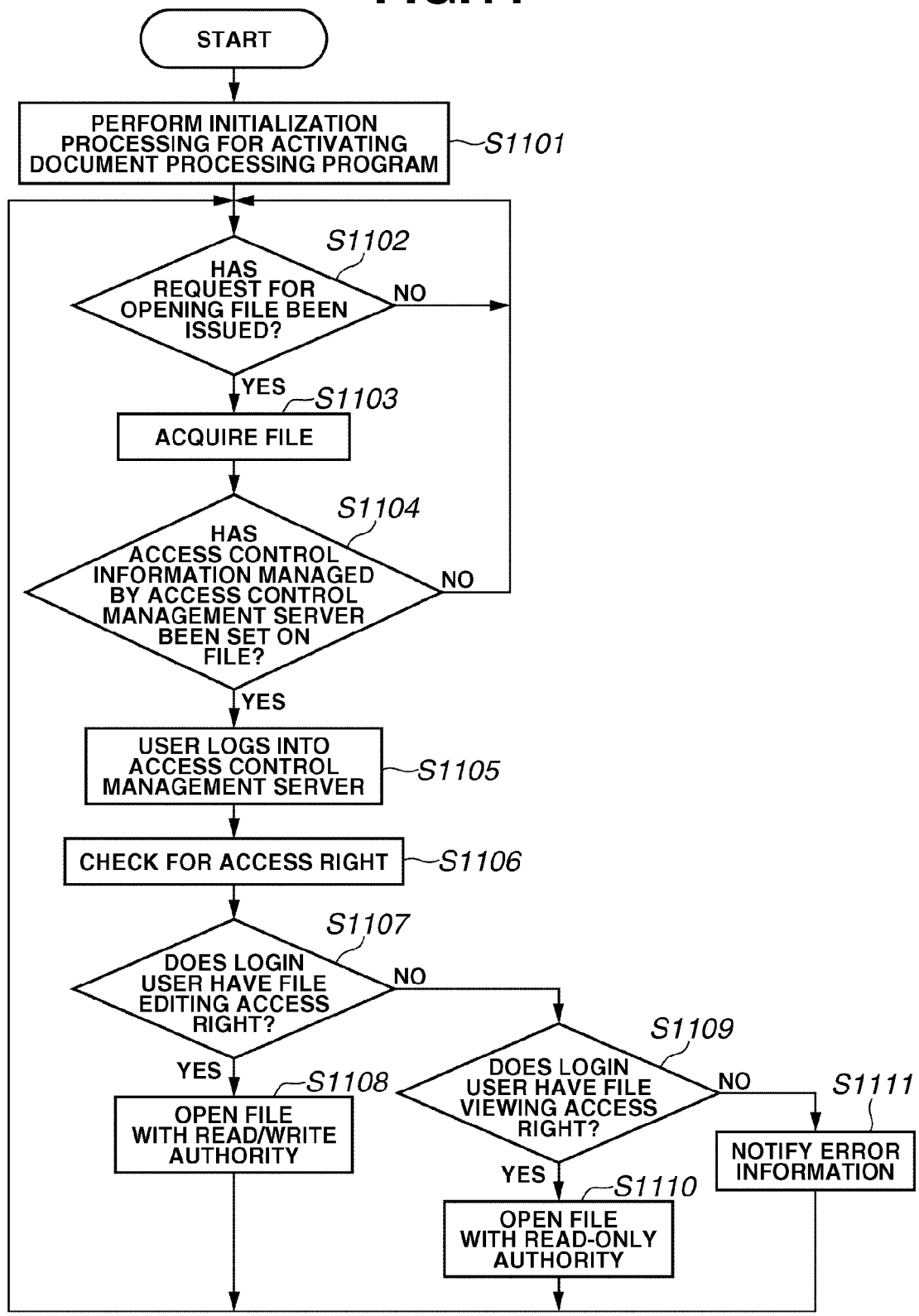
FIG. 11 is a flow chart illustrating an example of processing performed by a user computer for issuing a request for accessing a file having the access control information according to the first exemplary embodiment of the present invention.

Referring to FIG. 11, in step S1101, the CPU 200 performs necessary initialization processing to activate the document management program 503.

In step S1102, the CPU 200 determines whether the user has issued a request for opening a document file (hereinafter simply referred to as a "file").

If it is determined in step S1102 that the user has issued a request for opening a file (YES in step S1102), then the CPU 200 advances to step S1103. In step S1103, the CPU 200 acquires the designated file. On the other hand, if it is determined in step S1102 that the user has not issued a request for opening a file (NO in step S1102), then the CPU 200 waits until the user issues a request for opening a file.

The file can be stored in any storage area or storage device that can be accessed by the user. That is, the user can store the file on the HDD 305, a file server, or the document server 106.

In step S1104, the CPU 200 determines whether access control information (real policy) managed by the access control management server 103 has been set on the file.

If it is determined in step S1104 that access control information (real policy) managed by the access control management server 103 has been set on the file (YES in step S1104), then the CPU 200 advances to step S1105. On the other hand, if it is determined in step S1104 that access control information (real policy) managed by the access control management server 103 has not been set on the file (NO in step S1104), then the CPU 200 returns to step S1102.

In step S1105, the CPU 200 performs processing for allowing the user to log into the access control management server 103.

In step S1106, the access control management server 103 checks whether the login user (file access requesting user) has an access authority (access right) for accessing the file having the access control information (real policy).

The access right includes information about a right to view, edit, print, or send the file having access control information (real policy).

The access control management server 103 performs the processing in steps S1014, S1015, and S1016 (FIG. 10) according to the access right checking request. The computer 101 or 102 can acquire a result of access right checking processing in step S1016.

In step S1107, based on the result of checking in step S1106, the CPU 200 determines whether the login user has an access right for editing the file. The CPU 200 restricts the access to the file having the real policy based on the result of checking in step S1106.

If it is determined in step S1107 that the login user has an access right for editing the file (YES in step S1107), then the CPU 200 advances to step S1108. In step S1108, the document management program 503, under control of the CPU 200, opens the file with a read/write authority. Then, the processing returns to step S1102.

On the other hand, if it is determined in step S1107 that the login user does not have an access right for editing the file (NO in step S1107), then the CPU 200 advances to step S1109. In step S1109, based on the result of checking in step 1106, the CPU 200 determines whether the login user has an access right for viewing the file.

If it is determined in step S1109 that the login user has an access right for viewing the file (YES in step S1009), then the CPU 200 advances to step S1110. In step S1110, the document management program 503, under control of the CPU 200, opens the file with a read-only authority, and then notifies to the user that the file has been opened with a read-only authority. Then, the processing returns to step S1102.

If it is determined in step S1109 that the user does not have an access right for viewing the file (NO in step S1109), then the CPU 200 advances to step S1111. In step S1111, the CPU 200 notifies error information to the user. Then, the processing returns to step S1102.

As described above, according to the present exemplary embodiment, the policy selection menu can be customized by a user. Thus, a document can be managed according to a setting on a policy useful in a use environment of the user.

In addition, according to the present exemplary embodiment, a simple policy selection menu can be achieved. With the simple policy selection menu according to the present exemplary embodiment, a user can easily select a policy, and thus the user convenience can be improved.

Furthermore, according to the present exemplary embodiment, a policy selection menu can be shared between different devices. Thus, the policy selection menu can be displayed in a relatively short period of time.

Second Exemplary Embodiment

Now, a second exemplary embodiment of the present invention will be described below. In the first exemplary embodiment, access control information is set on a file of image data input in the image forming apparatus (MFP) 104.

In the present exemplary embodiment, the access control information is set on a PC of a user. In the present exemplary embodiment, the access control information is set on a file on a PC of the user. However, the access control information can be set on a file on another computer, such as another server apparatus. In this case, the flow of processing described below can be applied.

Figure 12:
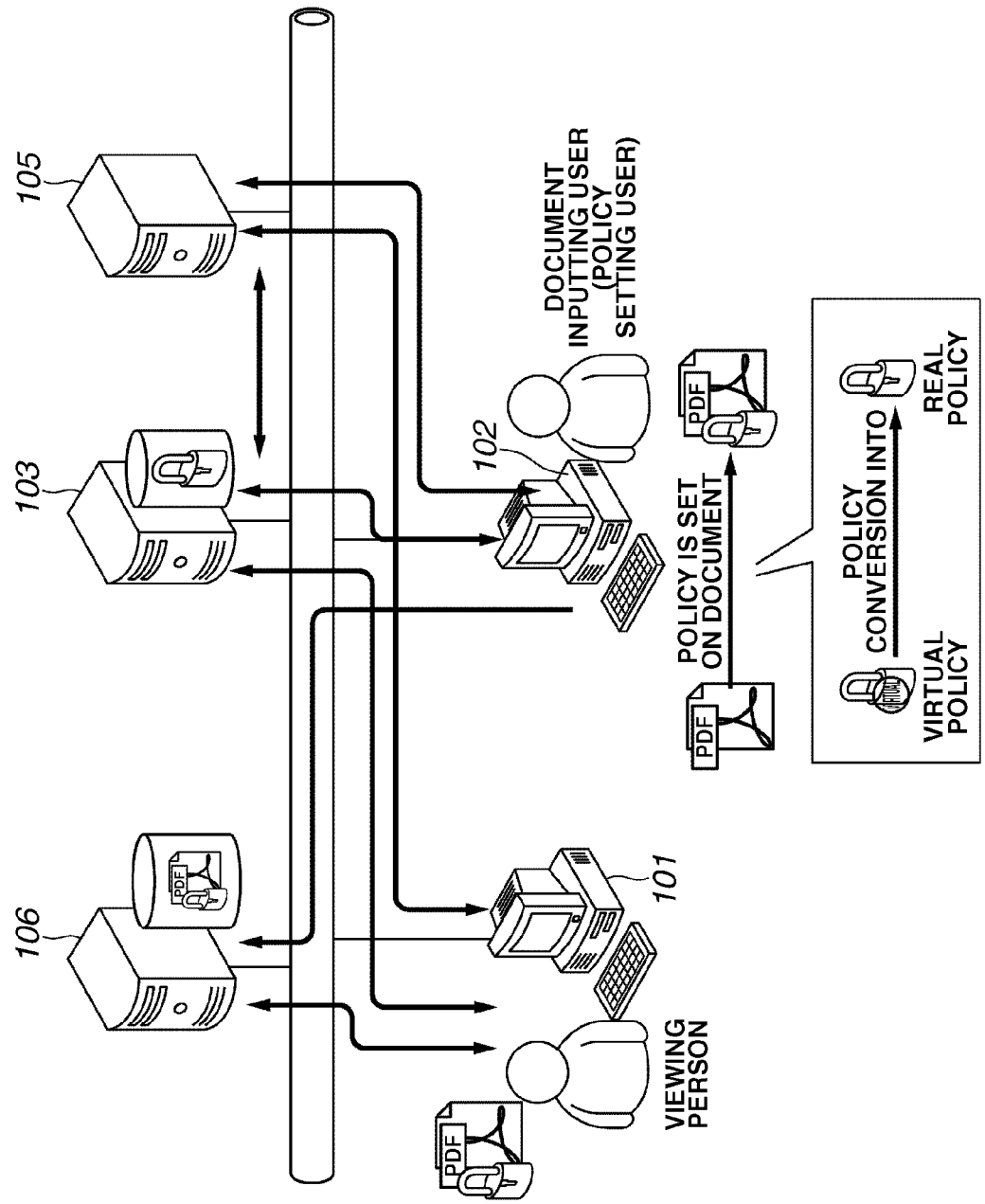
FIG. 12 illustrates an example of a configuration of a document management system according to a second exemplary embodiment of the present invention.

FIG. 12 illustrates an example of a configuration of a document management system according to the present exemplary embodiment.

In the example illustrated in FIG. 12, access control information is set on a document file that can be accessed from the computer 102, and the document file having the access control information is stored in the document server 106. In the present exemplary embodiment, components similar to those in the first exemplary embodiment are provided with the same reference numerals and symbols. Accordingly, a detailed description thereof will not be repeated here.

The computer 102 executes the document management program 503, with which access control information according to the present exemplary embodiment can be set. A user who has set a virtual policy and input image data of a document obtained by scanning the document to the document server 106 can perform various processing, such as user authentication processing, file selection processing, and policy selection processing, via a UI screen displayed on the computer 102.

In addition, the user can set access control information on the selected file and store the file having the access control information in the document server 106.

After receiving a policy conversion request from the computer 102, the access control management server 103 converts the virtual policy into a real policy by the above-described access control information setting processing (FIG. 9), and then sends the converted real policy to the computer 102.

The directory server 105 stores user information. The directory server 105 sends requested information in response to a request for user information and group information from the access control management server 103.

The user of the computer 101 can be a viewer who requests viewing (or an editor who requests editing) of the file stored in the document server 106.

In viewing (editing) the file, if the file has been provided with access control information, the computer 101 issues a request for information about an access right of the user to the access control management server 103. The access control management server 103 checks for the access right of the user, and based on a result of the checking for the access authority provided to the user with respect to viewing or editing the file, the access control management server 103 authenticates an access to the file by the user.

In the example illustrated in FIG. 12, the file is stored in the document server 106. However, the file can be stored in an arbitrary storage device or storage area such as a locally installed HDD of the computer 102, a shared folder on the network 107, or a file server.

The processing by the access control management server 103 and the processing by the computer 101 performed based on the request by the user who has requested an access to the file having the access control information are similar to those in the first exemplary embodiment.

A difference point from the first exemplary embodiment is that in the present exemplary embodiment, the policy setting user designates access control information on the computer 102. The processing for designating access control information is described below with reference to FIG. 16.

Figure 16:
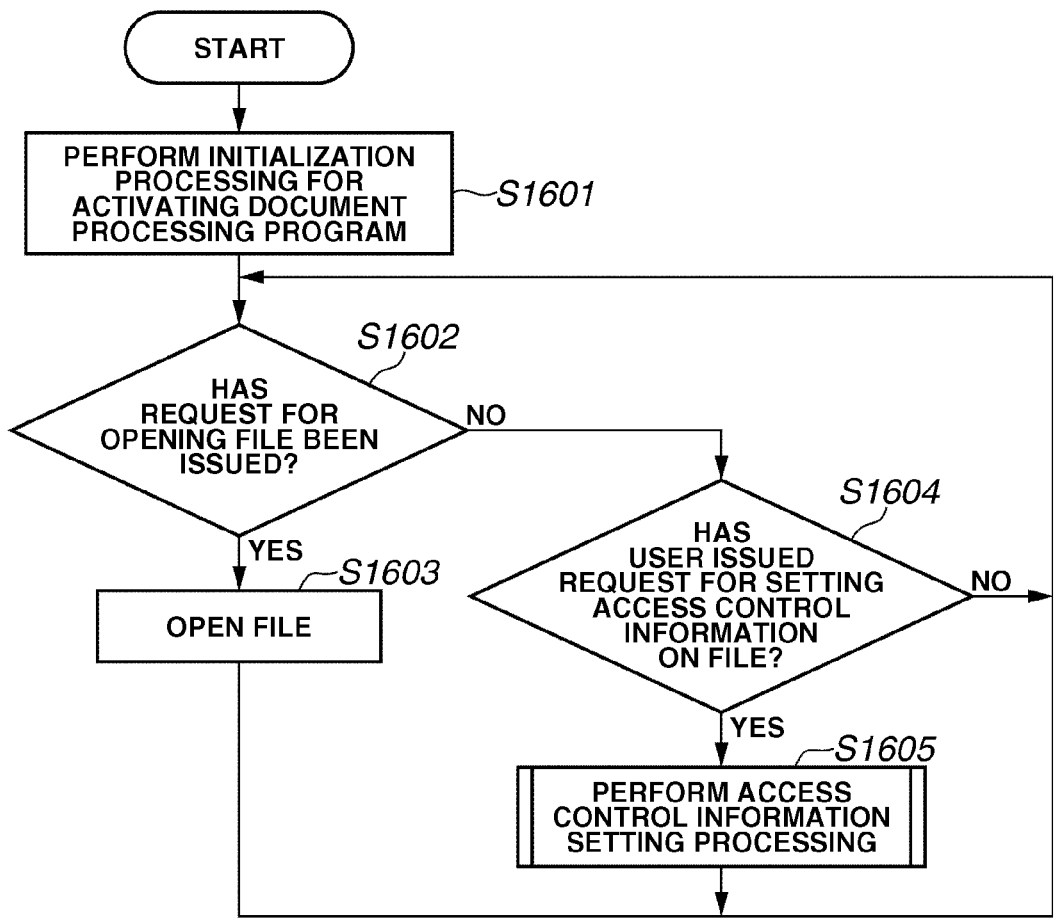
FIG. 16 is a flow chart illustrating an example of processing according to the second exemplary embodiment of the present invention.

The processing in the flow chart of FIG. 16 can be implemented as a program executed by the viewer (viewing user), including the processing in FIG. 11 in the first exemplary embodiment. The processing in FIG. 16 is implemented with the CPU 200 of the computer 102.

Referring to FIG. 16, in step S1601, the CPU 200 performs necessary initialization processing to activate the document management program 503.

In step S1602, the CPU 200 determines whether the user has issued a request for opening a file. If it is determined in step S1602 that the user has issued a request for opening a file (YES in step S1602), then the CPU 200 advances to step S1603. In step S1603, the CPU 200 acquires the designated file and displays the acquired file.

On the other hand, if it is determined in step S1602 that the user has not issued a request for opening a file (NO in step S1602), then the CPU 200 advances to step S1604. In step S1604, the CPU 200 determines whether the user has issued a request for setting access control information on the file.

If it is determined in step S1604 that the user has issued a request for setting access control information on the file (YES in step S1604), then the CPU 200 advances to step S1605.

In step S1605, after receiving the policy conversion request from the computer 102, the access control management server 103 converts the virtual policy into a real policy by the access control information setting processing (FIG. 9). Then, the access control management server 103 sends the converted real policy to the computer 102.

On the other hand, if it is determined in step S1604 that the user has not issued a request for setting access control information on the file (NO in step S1604), then the processing returns to step S1602.

As described above, according to the present exemplary embodiment, the policy selection menu can be customized by a user. Thus, a document can be managed according to a setting on a policy useful in a use environment of the user.

In addition, according to the present exemplary embodiment, a simple policy selection menu can be achieved. With the simple policy selection menu according to the present exemplary embodiment, a user can easily select a policy, and thus the user convenience can be improved.

Furthermore, according to the present exemplary embodiment, a policy selection menu can be shared between different devices. Thus, the policy selection menu can be displayed in a relatively short period of time.

Third Exemplary Embodiment

Now, a third exemplary embodiment of the present invention will be described below. In the above-described first and second exemplary embodiments, during the processing for setting a policy requested by a policy setting user, the access control management server 103 converts the virtual policy into a real policy, and thus access control information (real policy) is set on a file.

The timing for setting access control information (real policy) on a file is not limited to that described in each of the first and second exemplary embodiments. The virtual policy can be converted into a real policy when a request for accessing a file has been issued by a viewer (viewing user) or an editor.

In this case, the processing in steps S905 through S907 (FIG. 9) is not performed, and thus the virtual policy selected by the user in step S904 is set on a file.

Alternatively, the processing in steps S905 through S907 (FIG. 9) can be performed after the user has designated an access to the file for editing or viewing the file and a request for converting the virtual policy set on the file has been sent to the access control management server 103.

Further alternatively, the processing in steps S905 through S907 (FIG. 9) can be performed at the same time as the request for converting the virtual policy and the request for checking for a right to access the file have been issued.

Further alternatively, whether to convert a policy at the same time as the user sets the policy on the file and whether to convert a policy at the same time as the user (a viewer or an editor) issues a request for accessing the file can be set as an environmental setting for the document management system.

According to the present exemplary embodiment, even in the case where a data communication with the access control management server 103 is not available, a user can select a policy. Thus, it is not necessary that the user selects a policy again after the communication with the access control management server 103 has been restored.

Fourth Exemplary Embodiment

Now, a fourth exemplary embodiment of the present invention will be described below. In the first exemplary embodiment, the access control management server 103 performs the conversion of a virtual policy into a real policy. However, the present invention is not limited to this.

That is, the virtual policy selection processing, the access control information acquisition processing, and the processing for converting the virtual policy into a real security policy that can be interpreted by the document management system can be performed by one network device.

More specifically, the virtual policy selection processing, the access control information acquisition processing, and the processing for converting the virtual policy into a real security policy that can be interpreted by the document management system can be performed by the image forming apparatus (MFP) 104 in the case of the first exemplary embodiment. In the case of the second exemplary embodiment, it is the computer 102 (FIG. 12). In the case of the third exemplary embodiment, it is the computer of the viewer (viewing user).

In this case, the destination of the request for converting the policy issued during the access control information setting processing (steps S905 through S907 in FIG. 9) can be changed to a policy conversion application program for converting a policy, instead of the access control management server 103.

Furthermore, in this case, the processing in steps S1007 through S1012 (FIG. 10) can be implemented as the policy conversion application program.

The effects of each of the above-described first through third exemplary embodiments can be achieved with such a configuration according to the present exemplary embodiment that the policy setting user executes the policy conversion application program and performs the policy conversion requesting processing.

Other Exemplary Embodiments

The present invention can also be achieved by providing a system or an apparatus with a storage medium storing software program code implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disc, an MO, a CD-ROM, a CD-R, a CD-RW, a magnetic tape, a nonvolatile memory card, a ROM, and a digital versatile disc (DVD (a DVD-recordable (DVD-R) and a DVD-rewritable (DVD-RW)), for example, can be used.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another exemplary embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-286886 filed Oct. 20, 2006, which is hereby incorporated by reference herein in its entirety.

What is claimed is:

1. A document management system configured to manage an access to a file, the document management system comprising:
   at least one micro-processor, the micro-processor being programmed to control one or more of:
   a selection unit configured to select a virtual security policy, which is previously provided for each device;
   an acquisition unit configured to acquire access authority information for defining an authority for accessing the file based on the virtual security policy selected by the selection unit and authentication information about a user who has set the virtual security policy;
   a conversion unit configured to convert, based on the access authority information acquired by the acquisition unit, the virtual security policy into a real security policy that can be commonly interpreted by the document management system, wherein the converted real security policy corresponds to the authority of the user who has set the virtual security policy;
   a management unit configured to set the real security policy converted by the conversion unit on the file to manage an access to the file, and
   a file storage unit configured to set the virtual security policy selected by the selection unit on the file and then to store the file according to an environmental setting representing a timing of a conversion of the security policy by the conversion unit,
   wherein, on the timing according to the environmental setting, the conversion unit converts the virtual security policy into the real security policy and the management unit set the real security policy on the file.

2. The document management system according to claim 1, further comprising an access authority determination unit configured to determine whether a user requesting an access to the file has an access authority for accessing the file having the real security policy based on authentication information about the user requesting the access to the file.

3. The document management system according to claim 2, wherein the management unit controls an access to the file based on a result of determination by the access authority determination unit.

4. The document management system according to claim 1, wherein the access authority information acquired by the acquisition unit includes information for defining a type of an access to the file and information about a user group whose access to the file is controlled.

5. The document management system according to claim 4, further comprising a user group information storage unit configured to store information about the user group,
   wherein the acquisition unit acquires the information about the user group from the user group information storage unit based on the authentication information about the user who has set the virtual security policy, and
   wherein the conversion unit converts the virtual security policy into the real security policy based on the information about the user group acquired by the acquisition unit.

6. The document management system according to claim 1, further comprising:
   an access request determination unit configured to determine whether an access to the file stored in the file storage unit has been requested when the conversion of the security policy in response to the access to the file is set as the environmental setting; and
   wherein the conversion unit converts the virtual security policy set in the file into the real security policy based on the access authority information when the access request determination unit determines that an access to the file has been requested.

7. The document management system according to claim 1, wherein the selection unit, the acquisition unit, and the conversion unit are provided on a same network device included in the document management system.

8. The document management system according to claim 1, wherein the virtual security policy includes information required to be converted based on the authentication information and information about the authority, which is not required to be converted.

9. A method for a document management system configured to manage an access to a file stored in a memory, the method comprising:
   selecting a virtual security policy stored in the memory, which is previously provided for each device;
   acquiring access authority information for defining an authority for accessing the file from the memory based on the selected virtual security policy and authentication information about a user who has set the virtual security policy;
   converting, by a processor of the document management system, the virtual security policy into a real security policy that can be commonly interpreted by the document management system, wherein the converted real security policy corresponds to the authority of the user who has set the virtual security policy;
   setting the converted real security policy on the file to manage an access to the file, and setting the virtual security policy selected by the selecting step, by a file storage unit, on the file and then storing the file according to an environmental setting representing a timing of a conversion of the security policy by the converting step, wherein, on the timing according to the environmental setting, the converting step converts the virtual security policy into the real security policy and the setting the converted real security policy step sets the real security policy on the file.

10. The method according to claim 9, further comprising determining whether a user requesting an access to the file has an access authority for accessing the file having the real security policy based on authentication information about the user requesting the access to the file.

11. The method according to claim 10, further comprising controlling an access to the file based on a result of the determination as to whether the user accessing the file has an access authority for accessing the file having the real security policy.

12. The method according to claim 9, wherein the acquired access authority information includes information for defining a type of an access to the file and information about a user group whose access to the file is controlled.

13. The method according to claim 12, further comprising:
storing information about the user group in a user group information storage unit;
acquiring the information about the user group from the user group information storage unit based on the authentication information about the user who has set the virtual security policy; and
converting the virtual security policy into the real security policy based on the acquired information about the user group.

14. The method according to claim 9, further comprising:
determining whether an access to the file stored in the file storage unit has been requested when the conversion of the security policy in response to the access to the file is set as the environmental setting; and
wherein the converting step converts the virtual security policy set in the file into the real security policy based on the access authority information when the determining step determines that an access to the file has been requested.

15. The method according to claim 9, wherein selecting a virtual security policy, acquiring access authority information, and converting the virtual security policy into a real security policy are performed by a same network device included in the document management system.

16. The document management system according to claim 9, wherein the virtual security policy includes information required to be converted based on the authentication information and information about the authority, which is not required to be converted.

17. A non-transitory computer-readable storage medium storing instructions which, when executed by a document management system configured to manage an access to a file stored in a memory, cause the document management system to perform the method comprising:

selecting a virtual security policy stored in the memory, which is previously provided for each device;

acquiring access authority information for defining an authority for accessing the file from the memory based on the selected virtual security policy and authentication information about a user who has set the virtual security policy;

converting, by a processor of the document management system, the virtual security policy into a real security policy that can be commonly interpreted by the document management system, wherein the converted real security policy corresponds to the authority of the user who has set the virtual security policy;

setting the converted real security policy on the file to manage an access to the file, and setting the virtual security policy selected by the selecting step, by a file storage unit, on the file and then storing the file according to an environmental setting representing a timing of a conversion of the security policy by the converting step, wherein, on the timing according to the environmental setting, the converting step converts the virtual security policy into the real security policy and the setting the converted real security policy step sets the real security policy on the file.

* * * * *